United States Patent [19]

Kremer

[11] 4,332,374
[45] Jun. 1, 1982

[54] PROFILOMETER MOUNTING TECHNIQUE AND APPARATUS

[75] Inventor: Victor Kremer, Luxembourg, Luxembourg

[73] Assignee: Paul Wurth S.A., Luxembourg

[21] Appl. No.: 100,499

[22] Filed: Dec. 5, 1979

[30] Foreign Application Priority Data

Apr. 13, 1979 [LU] Luxembourg .......................... 81158

[51] Int. Cl.³ .............................................. C21B 7/24
[52] U.S. Cl. .................................... 266/99; 266/100; 343/12 R
[58] Field of Search ................ 266/99, 100; 343/12 R

[56] References Cited

U.S. PATENT DOCUMENTS 4,219,814  8/1980  Johnson .................................. 266/99

*Primary Examiner*—R. Dean
*Attorney, Agent, or Firm*—Fishman and Van Kirk

[57] ABSTRACT

Apparatus for measuring the contour of a surface without establishing contact therewith includes an energy transmitter movable in at least two directions. When employed in a shaft furnace the transmitter is movable along a longitudinal axis, so as to be either retracted to a protected location where it may be isolated from the furnace environment or extended so as to enable measurements, and is rotatable about the longitudinal axis so that the transmitted energy may be scanned across the surface.

13 Claims, 2 Drawing Figures

PROFILOMETER MOUNTING TECHNIQUE AND APPARATUS

BACKGROUND OF THE INVENTION

1. Field of the Invention

The present invention relates to measuring the contour of a surface from a position located remotely from that surface and particularly to determining the profile of the surface of charge material which has been deposited on the hearth of a furnace. More specifically, this invention is directed to apparatus which employs a beam of radiant energy, electromagnetic energy in the radio frequency spectrum for example, to determine the profile of the surface of the burden in a shaft furnace. Accordingly, the general objects of the present invention are to provide novel and improved method and apparatus of such character.

2. Description of the Prior Art

It is well known that proper exercise and control over the profile of the charge on the hearth of a blast furnace is essential to maximizing the efficiency of operation of the furnace. Obviously, in order to control charge profile, means must be provided for determining the contour of the surface of the charge at least on a periodic basis during the furnace charging procedure. Devices for making such measurements are known in the art as profilometers. The prior art profilometers may be classified generally as either being of the mechanical probe type or the radiant energy type. The early mechanical probe type profilometers were capable of making a measurement at only a single point. Improved mechanical probe type profilometers enable the shifting of that single point of contact with the surface of the charge. Nevertheless, for sufficient information to be collected so as to enable the charge profile to be determined with the requisite accuracy, a large number of individual measurements are required thus making the task of determining the charge profile a time-consuming endeavor. Examples of mechanical probe type profilometers of modern design may be found in U.S. Pat. Nos. 3,905,239 and 4,094,494. The profilometer of U.S. Pat. No. 4,094,494 is designed for use with a furnace charging installation of the type which is known in the art as a "bell-less top" or a "coneless throat." Such a charging installation, which employs a rotatable and angularly adjustable charge distribution chute positioned within the furnace, is shown and described in U.S. Pat. No. 3,693,812. The apparatus of U.S. Pat. No. 3,693,812 has the advantage of allowing excercise of a high degree of control over the charge profile when sufficient surface contour information is available.

Profilometers of the radiant energy type may be based upon radar technology and include means for transmitting electromagnetic energy to the charge surface and receiving energy reflected from the charge surface. A radar profilometer is described in Luxembourg Pat. No. 70310. Profilometers which employ a beam of radiant energy theoretically constitute a technical advance over mechanical probes since they offer the ability of collecting the requisite contour information rapidly and are suited for automated control. The information derived from the energy reflected from the charge surface and received back at the profilometer antenna, whether the profilometer is operated in accordance with a predetermined schedule or programmed with the charge distribution device, may be employed to control the motion of a charge distribution chute of a furnace charging installation of the type shown in U.S. Pat. No. 3,693,812.

Profilometers of the radiant energy type, for example those which operate on the principles of radar, present a number of operating problems which have previously prevented the use of these measuring devices and techniques on a commercial scale. By way of example, in order to perform maintenance operations on those components of the profilometer which must be directly exposed to the furnace operating environment during the taking of surface contour measurements, means must be provided for selectively hermetically isolating these components from the interior of the furnace. This hermetic isolation must be accomplished without impeding the operation of the furnace. Considering a radar profilometer, which would typically employ an antenna comprising a parabolic reflector having a diameter on the order of 300 mm, the aperture which must be provided in the furnace wall to enable removal of the antenna for servicing is quite large. This aperture must be hermetically closed without interfering with either the operation of the profilometer or the furnace and it is to be noted that the problem of providing such a hermetic seal is complicated by the fact that modern blast furnaces operate with high pressures.

A second, closely related problem resides in maintaining the profilometer in the operative state. The conditions within the furnace constitute an exceedingly harsh operating environment and a coating of particulate matter rapidly forms on all exposed surfaces located within this environment. The deposits which would form on the parabolic reflector of a radar antenna would, within a few days, render a radar profilometer inoperative.

SUMMARY OF THE INVENTION

The present invention overcomes the above briefly discussed and other deficiencies and disadvantages of the prior art by providing novel and improved method of and apparatus for transmitting radiant energy to the surface of the charge material on the hearth of a furnace and receiving energy reflected from the charge surface. Apparatus in accordance with the present invention serves the dual purposes of selectively hermetically isolating the transmitting and/or receiving device from the interior of a furnace, so as to permit maintenance operations, and keeping the device sufficiently clean so as to enable it to function properly for a reasonable period of time.

The aforementioned apparatus in accordance with the present invention comprises a device for mounting a probe, the parabolic antenna of a radar transceiver for example, so that it can alternatively be exposed to the environment existing within the furnace and hermetically isolated from such environment. In accordance with a preferred embodiment of the invention, a housing sized to accomodate the antenna, or other transmitting and/or receiving device, is provided in or on the wall of a furnace. A valve is provided for selectively establishing communication between the interior of this housing and the furnace interior and isolating the interior of the housing from the furnace interior. The antenna is mounted on the first end of an elongated, reciprocal member which extends through the wall of the furnace to an actuator disposed to the exterior of the furnace. By selectively operating this actuator, the antenna may be moved between a retracted position, where it is positioned within the aforesaid housing, and an extended position where the antenna or similar device is located within the furnace interior.

The elongated member on which the antenna or other transmitting and/or receiving device is mounted preferably comprises a tubular support which functions as the piston of a fluidic actuator mounted on an outside wall of the housing. In the case of a radar profilometer, the wave guide for conducting the rf signals between the antenna and the electronics will pass through this tubular member; the electronics also being located to the exterior of the housing and the furnace.

Continuing with the discussion of the preferred embodiment, scanning of the charge surface with the beam of energy emitted from the antenna is accomplished by imparting oscillatory motion to the elongated tubular support member on which the antenna is mounted. This oscillatory motion is generated by means, including a motor, positioned to the exterior of the furnace which causes the elongated member to rotate about its longitudinal axis.

Also in accordance with the preferred embodiment of the invention, the valve which selectively isolates the interior of the aforementioned housing from the furnace interior consists of a valve member which is movable transversely with respect to the direction of motion of the antenna or similar device. Motion may be imparted to the valve member by means of a fluidic actuator positioned to the exterior of the furnace and having its piston rod attached to the valve member.

A particularly advantageous feature of the present invention resides in the fact that the size of the opening which must be sealed to hermetically isolate the profilometer from the furnace interior is minimized. In the case of previously proposed profilometers of the radiant energy type, the beam of energy transmitted to the surface of the furnace charge passed through an exit opening and thus this opening had to be sufficiently large to enable the scanning of the beam. In accordance with the present invention, since the scanning motion is imparted to the antenna only after it has been extended into the furnace interior, the opening need be only slightly larger than the antenna itself. Accordingly, the sealing requirements, and particularly the physical size of the valve member necessary to accomplish the hermetic isolation of the housing interior from the furnace interior, are minimized.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
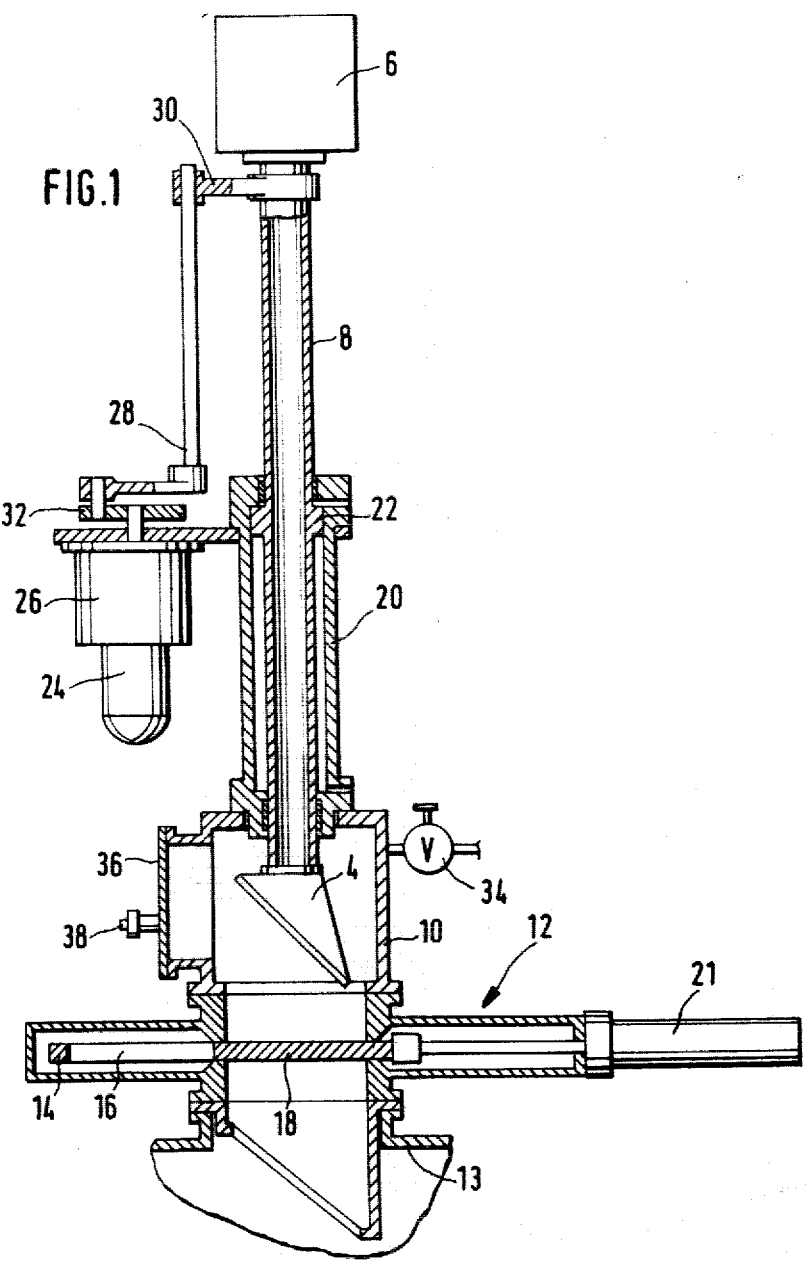
FIG. 1 is a schematic, cross-sectional, side elevation view of a radar profilometer in accordance with a preferred embodiment of the present invention.

Referring now to the drawing, the transmitting and receiving antenna of a radar type profilometer is indicated at 4. Antenna 4 will typically comprise a parabolic reflector and will be coupled to a transmitter and signal processing electronics, which have been indicated at 6, by means of a rigid wave guide, not shown. Antenna 4 is mounted on the first end of a movable, tubular support member 8 and the aforementioned wave guide will extend through the interior of support member 8.

In FIG. 1 the antenna 4 is depicted in its retracted or inoperative position. In the inoperative position, antenna 4 is located within a housing 10 which is mounted on the wall 13 of a furnace. Housing 10 is open at one side and this open side communicates with the interior of the furnace, via a valve indicated generally at 12, through an opening provided in furnace wall 13. The valve 12 functions to selectively isolate the interior of housing 10 from the interior of the furnace or to establish communication between the interior of housing 10 and the furnace interior. In performing this function, valve 12 comprises a valve member or register 14 which is preferably of the "spectacle blind" type. Valve member 14 will include an open portion 16, commensurate in size and shape with the opening by which communication is established between the interior of housing 10 and the furnace interior, and a disc portion 18 which is sized and shaped so as to hermetically seal the aforesaid opening. In the disclosed embodiment the valve member 14 is actuated by means of a hydraulic jack 21 positioned to the exterior of the furnace. Accordingly, to move the valve from the closed position of FIG. 1 to the open position of FIG. 2, the piston of actuator 21 will be retracted whereby disc 18 will slide into a chamber defined by flanges on the lower portion of housing 10 and the portion of valve member 14 which defines opening 16 will be withdrawn from an oppositely disposed chamber which is also defined by flanges on housing 10.

The tubular support member 8 passes through the cylinder of an actuator 20 which is mounted on the exterior of the rear wall of housing 10. Actuator 20 is preferably a pneumatic jack. Member 8 is provided with an annular collar 22 whereby the tubular support member 8 may function as the piston of actuator 20. By controlling the delivery of the fluid to the cylinder of actuator 20 at either side of collar 22, through means not shown, the antenna 4 may be moved between the retracted or inoperative position shown in FIG. 1 and the extended or operative position shown in FIG. 2. It will, of course, be understood that means are provided for preventing the movement of antenna 4 between the position on FIG. 1 to that of FIG. 2 when valve 12 is in the closed position of FIG. 1.

In order to scan the beam of energy emitted from antenna 4 across the surface of the charge on the furnace hearth, means must be provided for imparting motion to the antenna. In the disclosed embodiment, the motion producing means comprises an electric motor 24. The output shaft of motor 24 is coupled, via reduction gearing 26, to a crank arm 32. Arm 32 is coupled, via a crank member 28, to a connecting arm 30. Accordingly, the rotary motion of arm 32 about the aligned axes of motor 24 and reduction gearing 26 will be converted into oscillating movement of the support member 8 about its longitudinal axis. As may be seen from comparison of FIGS. 1 and 2, the connecting arm 30 is capable of sliding along crank 28 whereby member 8 may move longitudinally relative to the stationary motor 24 under the control of actuator 20. Since the oscillatory motion about the axis of support member 8 will be produced only when the antenna 4 is in the position shown in FIG. 2, there is practically no flexural force resulting from the length of crank 28.

In order to prevent or reduce the flow of the dirty furnace gases into housing 10, a positive pressure relative to the pressure existing within the furnace may be established within housing 10. For this purpose, a cooled inert gas may be supplied to the interior of housing 10 via the valve 34. The gas supplied via valve 34 will, if a sufficiently high pressure is maintained, flow downwardly through valve 12 when the valve is in the open position and will thus prevent the penetration of dust into housing 10.

Figure 2:
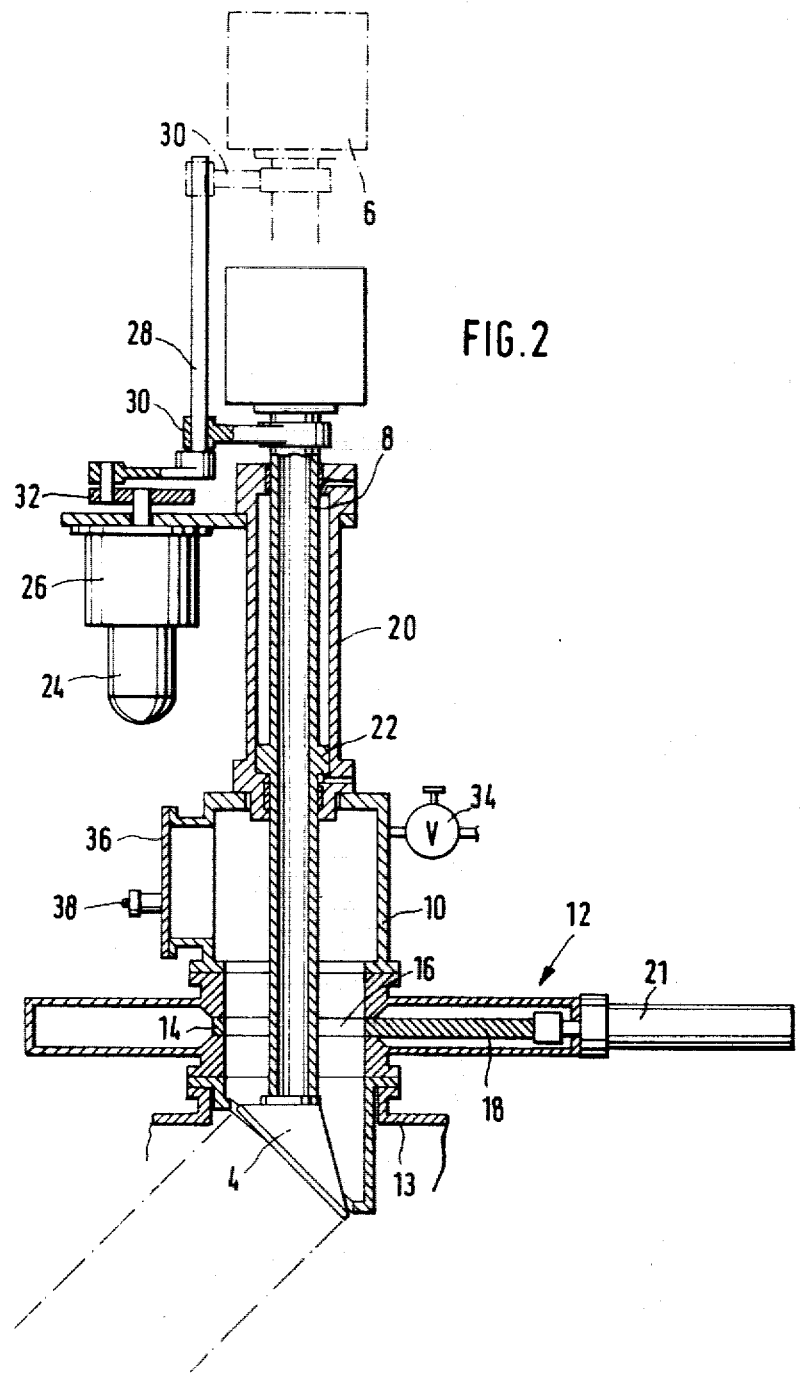
FIG. 2 is a view similar to FIG. 1 depicting the apparatus in the operative position.

It is also possible to provide for establishment of a gas "curtain" which will prevent or minimize the forming of deposits on the antenna 4 when it is in the position shown in FIG. 2. This may, for example, be accomplished by providing one or more nozzles which convey fluid under pressure to the reflector surface of antenna 4. This gas may be delivered to the antenna by means of conduits provided within the tubular support member 8.

Housing 10 is provided with a removable cover 36. With valve 12 closed, the cover 36 may be removed to gain access to antenna 4 for maintenance purposes. Cover 36 may be provided with a visual inspection port 38 whereby the condition of the antenna, and particularly the reflector, may be observed without the necessity of removing cover 36.

The method by which the radar profilometer operates in order to record the profile of the charging surface is described in aforementioned Luxembourg Pat. No. 70,310. The antenna 4 is preferably oriented such that, when it has been extended to the position shown in FIG. 2 and motor 24 actuated, the transmitted beam of radiant energy will be scanned across a diameter of the furnace hearth. It is to be noted that the connection between antenna 4 and support member 8 may be made automatically or manually adjustable whereby the region of charge surface scanned by the energy may be varied thereby permitting recordation of a number of different profile lines.

As previously noted, the opening 16 in valve member 14 should be just large enough to enable antenna 4 to move from the position of FIG. 1 to that of FIG. 2 and vice versa. If scanning were required with the antenna in the FIG. 1 position, valve 12 would necessarily be much larger in order to enable a divergent and oscillating beam to be emitted and received. In the disclosed embodiment of the invention, an aperture of between 350 and 450 mm in diameter between housing 10 and the interior of the furnace is sufficient to permit use of a standard antenna having a reflector of 300 mm in diameter. If a longitudinally movable antenna was not employed, for the same size antenna an aperture of substantially rectangular shape and measuring 900 by 1800 mm would be required. This large aperture would, in turn, require the use of an extremely large valve thereby presenting serious problems with regard to hermeticity and space. Since the valve 12 of the present invention is of modest size, the space required for mounting the profilometer in or on the furnace is not excessive and, in fact, it is possible to use two or more profilometers which scan the charging surface from different positions. With two profilometers, two profile recordings in perpendicular direction can be effected thereby enabling very accurate information to be provided concerning the profile of the charging surface.

While a preferred embodiment has been shown and described various modifications and substitutions may be made thereto without departing from the spirit and scope of the invention. Accordingly, it is to be understood that the present invention has been described by way of illustration and not limitation.

What is claimed is:

1. Apparatus for measuring the profile of the material deposited on the hearth of a pressurized shaft furnace, the furnace having a wall which is provided with an aperture therethrough, said apparatus comprising:

signal emitter means, said signal emitter means including the antenna means for directing a beam of radiant energy toward the furnace hearth;

housing means, said housing means defining an internal chamber of sufficient volumn and shape to accomodate said signal emitter means antenna means, said housing means having an opening through one side thereof and being mounted on the exterior of the furnace wall with the said opening therein in registration with the furnace wall aperture;

a moveable elongated tubular support member, said support member having an axis and extending into said internal chamber through a second side of said housing means, said signal emitter means antenna means being mounted on said support member for movement therewith;

means for imparting longitudinal movement along said axis to said support member whereby said antenna means may selectively be retracted into said housing means or extended out of said housing means through said opening to enable the beam of radiant energy to be directed to and reflected from the material on the furnace hearth;

means for imparting oscillatory motion about said axis to said support member to cause the beam of radiant energy to be scanned; and valve means cooperating with said housing means opening to hermetically seal the interior of said housing from the interior of the furnace when said antenna means is in the retracted position.

2. The apparatus of claim 1 wherein said longitudinal movement imparting means comprises:

a fluidic actuator, said actuator being mounted outside the furnace, said tubular member extending through said actuator and comprising the piston thereof.

3. The apparatus of claim 2 wherein said oscillatory motion imparting means is positioned outside the furnace and comprises:

a motor, said motor having a rotatable output shaft;

crank means, said crank means having an elongated crank arm, said crank arm having an axis which is oriented parallely with respect to the axis of said tubular member;

means connecting the output shaft of said motor to said crank means; and means coupling said crank means arm to said tubular member, said coupling means permitting relative movement of said tubular member with respect to said crank means during extension and retraction of said antenna means.

4. The apparatus of claim 1 wherein said valve means comprises:

a movable valve member;

flange means, said flange means extending from said housing and defining a chamber for accomodating at least a portion of said valve member; and means for causing said valve member portion to move into and out of said flange means defined chamber to operate said valve means between the opened and closed positions.

5. The apparatus of claim 4 wherein said valve member is slidable and wherein said means for causing movement of said valve member comprises:
a first fluidic actuator, said first actuator being positioned outside of said housing means and having a reciprocal output member connected to said valve member whereby said valve member is movable in a plane which intersects said support means axis at an angle.

6. The apparatus of claim 5 wherein said support means comprises:
a tubular member; and wherein said longitudinal movement imparting means comprises:
a second fluidic actuator, said second actuator being mounted outside the furnace, said tubular member extending through said second actuator and comprising the piston thereof.

7. The apparatus of claim 6 wherein said oscillatory motion imparting means is positioned outside the furnace and comprises:
a motor;
crank means, said crank means having an elongated crank arm, said crank arm having an axis which is oriented parallely with respect to the axis of said tubular member;
means connecting the output shaft of said motor to said crank means; and
means coupling said crank means arm to said tubular member, said coupling means permitting relative movement of said tubular member with respect to said crank means during extension and retraction of said antenna means.

8. The apparatus of claim 1 wherein said housing means has a second opening in a wall thereof, said second opening being of sufficient size to permit passage of said antenna means therethrough, and wherein said apparatus further comprises:
removable cover means for said housing means second opening.

9. The apparatus of claim 7 wherein said housing means has a second opening in a wall thereof, said second opening being of sufficient size to permit passage of said antenna means therethrough, and wherein said apparatus further comprises:
removable cover means for said housing means second opening.

10. The apparatus of claim 9 further comprising:
visual inspection means mounted in said cover means whereby the condition of said antenna means may be inspected without removal of said cover means.

11. The apparatus of claim 1 further comprising:
means for establishing a positive pressure differential between the inside of said housing means and the furnace interior.

12. The apparatus of claim 5 further comprising:
means for establishing a positive pressure differential between the inside of said housing means and the furnace interior.

13. The apparatus of claim 9 further comprising:
means for injecting an inert gas into said housing means to establish a pressure within said housing means which exceeds the pressure within the furnace.

* * * * *